United States Patent

Iino et al.

Patent Number: 6,142,520
Date of Patent: *Nov. 7, 2000

[54] AIR BAG

[75] Inventors: Yasuhiro Iino; Tomozane Terazawa, both of Yokohama; Yosuke Matsushima, Sagamihara, all of Japan

[73] Assignee: Bridgestone Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/907,864

[22] Filed: Aug. 11, 1997

[30] Foreign Application Priority Data

Aug. 12, 1996 [JP] Japan .................................. 8-212562

[51] Int. Cl.⁷ .................................................. B60R 21/16
[52] U.S. Cl. ...................................... 280/743.1; 280/728.1
[58] Field of Search ........................... 280/743.1, 728.1

[56] References Cited

U.S. PATENT DOCUMENTS 5,100,168  3/1992  Horiuchi et al. .
5,524,926  6/1996  Hirai et al. ......................... 280/743.1

FOREIGN PATENT DOCUMENTS

| 0380699 | 8/1990 | European Pat. Off. . |
|---|---|---|
| 0702106 | 3/1996 | European Pat. Off. . |
| 195 13 297 A1 | 11/1995 | Germany . |
| 2114035 | 4/1990 | Japan . |
| 2-237837 | 9/1990 | Japan .................. 280/743.1 |
| 3208746 | 9/1991 | Japan .................. 280/743.1 |
| 4201649 | 7/1992 | Japan . |
| 4325342 | 11/1992 | Japan . |
| 7291069 | 11/1995 | Japan . |
| 2252983 | 8/1992 | United Kingdom . |

*Primary Examiner*—Eric Culbreth
*Attorney, Agent, or Firm*—Sughrue, Mion, Zinn, Macpeak & Seas, PLLC

[57] ABSTRACT

An air bag includes a pair of laminated films and an opening for inflator, in which each laminated film is at least one elastomer layer and at least one shape holding layer.

8 Claims, 6 Drawing Sheets

FIG_4

AIR BAG

BACKGROUND OF THE INVENTION

1. Field of the Invention

This invention relates to a light weight air bag for use in the protection of occupants in an automobile from the automobile accident which develops excellent energy absorption performance and is capable of sufficiently preventing accidental breakage or the like due to local concentration of stress, excessive stretching and the like.

2. Description of Related Art

Within this technology, there is known an air bag disclosed, for example, in JP-A-7-291069.

Such an air bag is constructed by adhering a resin film to a portion of an elastomer film to regulate excessive expansion of the air bag made from the elastomer film to enhance the energy absorption performance. In this case, if the occupant moves suddenly into the developed air bag, the stretching of a portion of the elastomer film adhered with the resin film is controlled, while the remaining portion of the elastomer film not adhered with the resin film is stretched to absorb shock through impact.

In the conventional air bag made by locally adhering the resin film to the elastomer film, however, when the shock through impact is absorbed by the stretching deformation of the portion of the elastomer film not adhered with the resin film, a large stress concentrates in a position at a boundary between the adhered portion and the non-adhered portion of the resin film. This may result in a burst resulting from the implosion of the air bag at this position becoming high. Further, the total area of the stretching deformable elastomer film is small, so that the elastomer film is stretched over its stretching limit by the large impact action. Hence there is a possibility of breaking the air bag.

In addition, when the resin film is not adhered to the surface of the elastomer film located opposite to the occupants, the elastomer film is excessively stretched, so that when such a stretched elastomer film simply contacts with a slight protrusive portion of a constructional member located in a side of the vehicle body, these is a possibility of simply breaking the air bag.

SUMMARY OF THE INVENTION

It is, therefore, an object of the invention to solve the aforementioned problems of the conventional techniques and provide an air bag having high strength and light weight which can sufficiently absorb impact energy and does not have the potential for burst, breakage and the like even if a large impact force is applied.

The air bag according to the invention is comprised of two or three laminated films formed by joining them at their peripheral edge portions to each other through heat seal, impulse seal, high-frequency welder seal, supersonic seal or the like and has a bag shape as a whole having an opening for the insertion of an inflator, in which the laminated films are at least one elastomer layer and at least one shape-holding layer.

In this air bag, the elastomer layer and the shape holding layer are laminated with each other over their full surfaces irrespective of the portion facing the occupants or the portion opposite to the occupants. Thus the excessive stretching deformation of the air bag in the expansion of the air bag, the collision of the occupant with the expanded air bag and the like is effectively restrained by the action of the shape holding layer. As a result, the energy absorption in collision with the occupant is attained very effectively.

That is, according to the invention, stress is not locally applied to the elastomer layer at a boundary position between the laminated region and the non-laminated region of the shape holding layer. The elastomer layer having a small total area is not locally and excessively stretched and the elastomer layer is not freely stretched without restraining by the shape holding layer. Thus the occurrence of accidental breakage or the like in the air bag is sufficiently prevented independent of the magnitude of impact force input to the air bag.

In the air bag according to the invention, the elastomer layer sufficiently mitigates the impact shock owing to the high flexibility, stretchability and the like inherent to the elastomer layer when the occupant moves suddenly into the air bag. Further, the elastomer layer functions to enhance the joining strength of the mutual joint portion between the laminated films and acts to sufficiently prevent the lowering of strength in the folded portion of the air bag.

Preferably, the laminated films according to the invention have a three-layer laminated structure comprised of two elastomer layers and a shape holding layer interposed therebetween.

More preferably, the elastomer layer is made from a thermoplastic elastomer such as urethane, ester or amide, while the shape holding layer is made from a polycarbonate, a polyamide, a polyimide or a thermoplastic elastomer having a JIS-A-hardness of not less than 95 degrees.

BRIEF DESCRIPTION OF THE DRAWINGS

The invention will be described with reference to the accompanying drawings, wherein.

DESCRIPTION OF THE PREFERRED EMBODIMENTS

Figure 1:
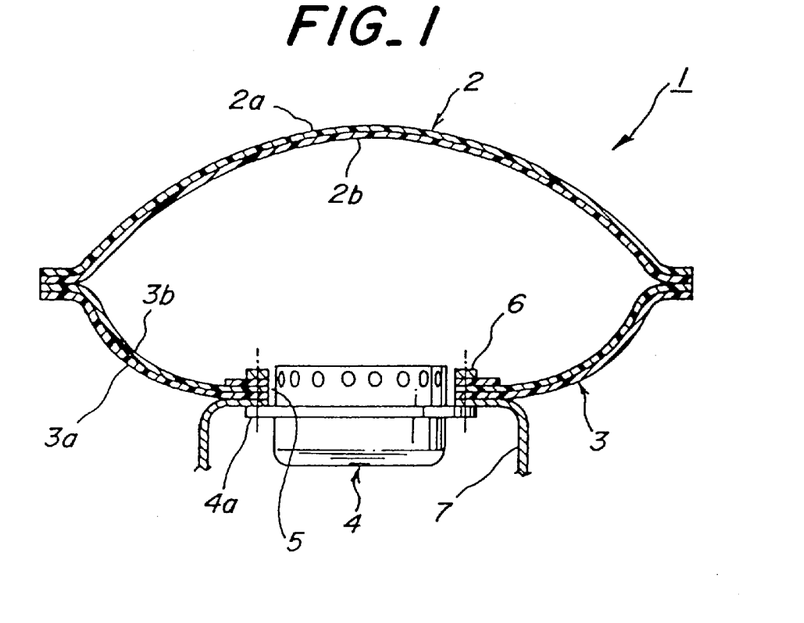
FIG. 1 is a diagrammatically section view of a main part of an embodiment of the air bag according to the invention.

FIG. 1 sectionally illustrates a main part of an air bag applied to a driver's side of a vehicle in an expanded state. This air bag 1 is formed by airtightly joining a front-side laminated film 2 having a circular form facing a driver's seat and a rear-side laminated film 3 facing a side of a vehicle body and having an outer profile size substantially equal to that of the front-side laminated film 2 to each other at their peripheral edge portions. A proper sealing method, for example, a high-frequency welder sealing method issued and the air bag is provided at a central portion of the back-side laminated film 3 with an opening 5 for the insertion of an inflator 4.

In this case, assembling the air bag 1 and the inflator 4 can be carried out by sandwiching an opened peripheral portion of a base plate 7 attached to a steering shaft and a peripheral edge portion of the opening 5 formed in the back-side laminated film 3 between a flange portion 4a of the inflator 4 provided with a gas jetting portion placed in the opening 5 of the back-side laminated film 3. A retainer ring 6 is arranged around the opening 5 and at an inner surface side of the back-side laminated film 3, respectively.

Each of the front-side and back-side laminated films 2, 3 may be comprised of, for example, a laminate of one elastomer layer 2a (or 3a) and one shape holding layer 2b (or 3b). In the front-side laminated film 2, when the elastomer layer 2a having a more flexible property is located at the outer surface side of the film, the protection property against the occupant can be enhanced. When the laminated films 2, 3 are joined to fix the elastomer layers 2a, 3a at the inner surface sides of the films, the joint strength therebetween can advantageously be enhanced.

The laminated films 2, 3 of the above structure can effectively mitigate the impact shock of the occupant to the air bag under a high energy absorbing ability based on excellent flexibility, stretchability and the like and can prevent the folding of the shape holding layer to prevent the lowering of the fold strength.

The shape holding layers 2b, 3b are laminated on the entire area of the elastomer layers 2a, 3a and have preferably a thickness of about 5–100 μm to effectively prevent excessive stretching and local stretching of the elastomer layers 2a, 3a. This effectively prevents the occurrence of breakage, burst and the like of the air bag based on the action of the shape holding layer for properly controlling the deformation and stretching of the elastomer layer.

In the invention, each of the laminated films 2, 3 can be carried out by laminating a film-shaped elastomer layer 2a, 3a onto a film-shaped shape holding layer 2b, 3b through an adhesive layer, or by extrusion-coating either one of film-shaped layers onto the other layer, or by simultaneously forming both the layers through multi-layer extrusion.

Moreover, each of the laminated films 2, 3 may have a lamination structure of three or more layers. (See FIG. 4.) When the lamination structure of the laminated film is comprised of two elastomer layers and one shape holding layer interposed therebetween, if two or three laminated films having such a lamination structure are joined at their peripheral edge portions, since the elastomer layer becomes always a joint layer, the joint strength between the films can sufficiently be increased and also the touch feeling of the air bag by the crew in the impact can be improved. Furthermore, when the lamination structure is comprised of two shape holding layers and one elastomer layer interposed therebetween, the shape holding function can be sufficiently developed even against a large impact force or the like while ensuring excellent energy absorption performance of the air bag.

These lamination structures can be realized by dry lamination interposing an adhesive between the layers, extrusion coating of two layers on both surfaces of a specified layer, extrusion lamination of joining plural film layers to each other through molten resin, multi-layer extrusion using a T-die or an inflation die and the like in substantially the same method as described in the aforementioned embodiment.

When a thermoplastic elastomer such as urethane, ester or amide is selected as the elastomer layer, the joint strength can be increased. Also the impact shock to the occupant in the expansion of the air bag can be effectively mitigated.

On the other hand, when polycarbonate, polyamide, polyester, polyimide or a thermoplastic elastomer having JIS-A hardness of not less than 95° is selected as a material of the shape holding layer, the elongation of the elastomer layer exceeding the elongation at break due to the large impact force can be effectively controlled.

Of course, the joining of peripheral edge portions between the front-side laminated film 2 and the rear-side laminated film 3 can be carried out by directly sealing both films through a high-frequency welder sealing or the like. In order to ensure sufficient peel strength against force in peeling direction acting to the joint portion between the laminated films 2 and 3 during rapid expansion of the air bag 1 through the filling of nitrogen gas or the like, the impact of the occupants to the expanded air bag 1, as shown, for example, by a partially enlarged section view in FIG. 2a, it is favorable that weld layers 8, 9 each made from a thermoplastic resin material are disposed on opposed surfaces of the front-side and rear-side laminated films 2, 3. The weld layers 8, 9 are locally joined to each other at an outward peripheral region in the radial direction of the air bag 1.

Figure 2A:
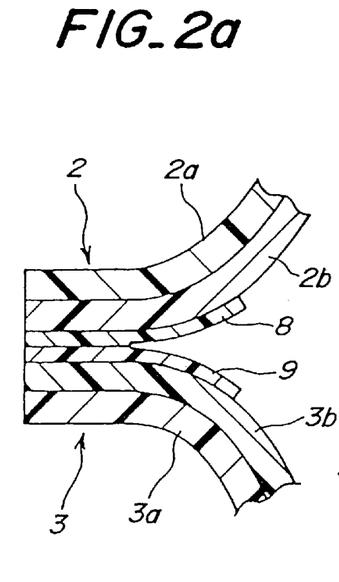
FIG. 2a is a partly enlarged section view illustrating a state of joining laminated films at their peripheral edge portions.

According to such joining structure between the laminated films 2, 3, the force in the peeling direction acting on the joint portion is supported not only by the joint portion between the mutual weld layers 8 and 9 but also the joint portions between the weld layer 8 and the laminated film 2 and between the weld layer 9 and the laminated film 3. The effect is to effectively disperse the force in the peeling direction, whereby the peel strength in the joint portion between the laminated films 2 and 3 can largely be increased.

Figure 2B:
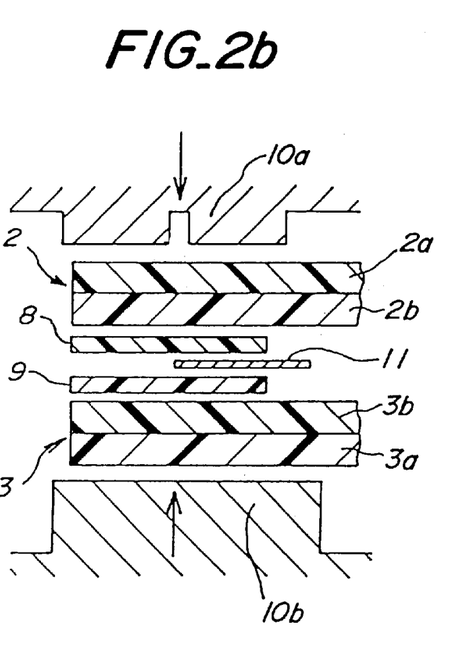
FIG. 2b illustrates the materials positioned prior to lamination.

FIG. 2b is a section view illustrating the formation of the above joining structure by means of a high-frequency welder, in which the laminated films 2 and 3 are set to face the shape holding layers 2b and 3b to each other between a pair of upper and lower electrodes 10a, 10b arranged substantially in parallel to each other, while the weld layers 8, 9 are set between the shape holding layers 2b and 3b. Further a peeling member 11. acting to form a non-joining portion over a given region is set between the weld layers 8 and 9 and thereafter both the lectrodes 10a, 10b are closed to each other under pressure. A high frequency voltage is applied between the electrodes 10a, 10b.

In this manner, the weld layers 8, 9 are welded to the respective shape holding layers 2b, 3b and bonded to each other at a portion other than the interposed region of the peeling member 11. As a result the peeling member 11 made from Teflon film, paper, olefinic resin film or the like is removed after joining or it remains as it is according to circumstance. The expansion form of the air bag 1 as shown in FIG. 2a can be produced by the filling of gas.

Figure 3A:
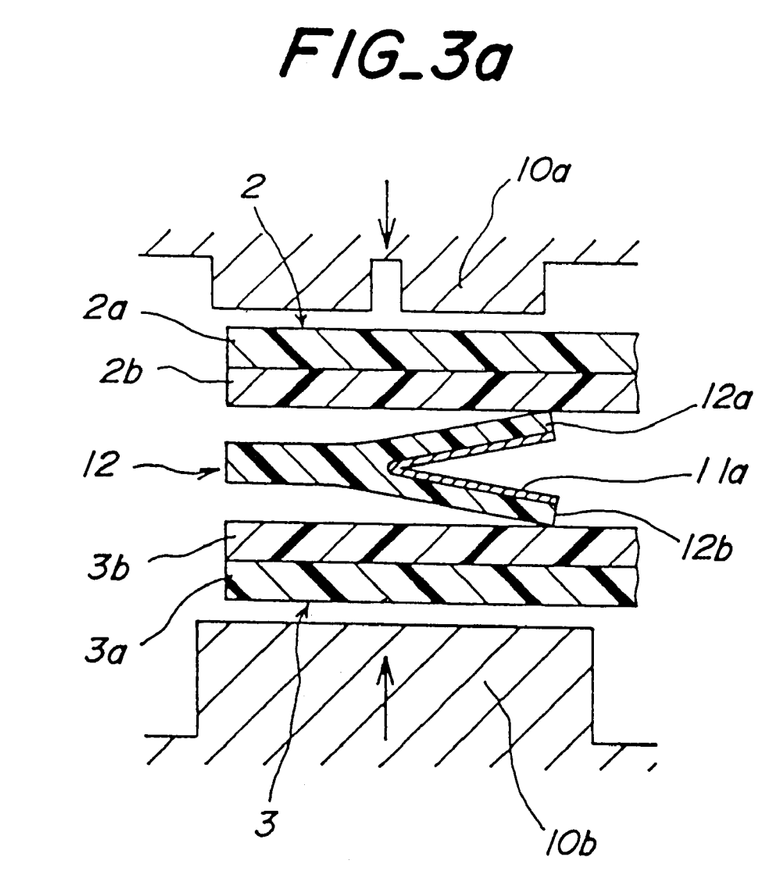
FIG. 3a illustrates materials positioned prior to lamination in a second embodiment and FIG. 3b is a partly enlarged section view illustrating the state of joining laminated films at their peripheral edge potions.

The joint structure similar to the above can be produced, as illustrated in FIG. 3a, by arranging a single weld layer 12 having substantially a Y-shaped section, which is formed by previously inserting a peeling member 11a into the weld layer up to a middle position in the widthwise direction thereof, between the laminated films 2 and 3 disposed between the electrodes 10a, 10b.

For example, when the peeling member 11a is made from an olefinic resin, it is possible to previously unite the weld layer 12 and the peeling member 11a with each other by co-extrusion shaping. As a result, the number of elements can effectively be reduced as compared with the case of using two weld layers 8,9 in FIG. 2 and separately arranging two peeling members 11 therebetween as previously mentioned.

Figure 3B:
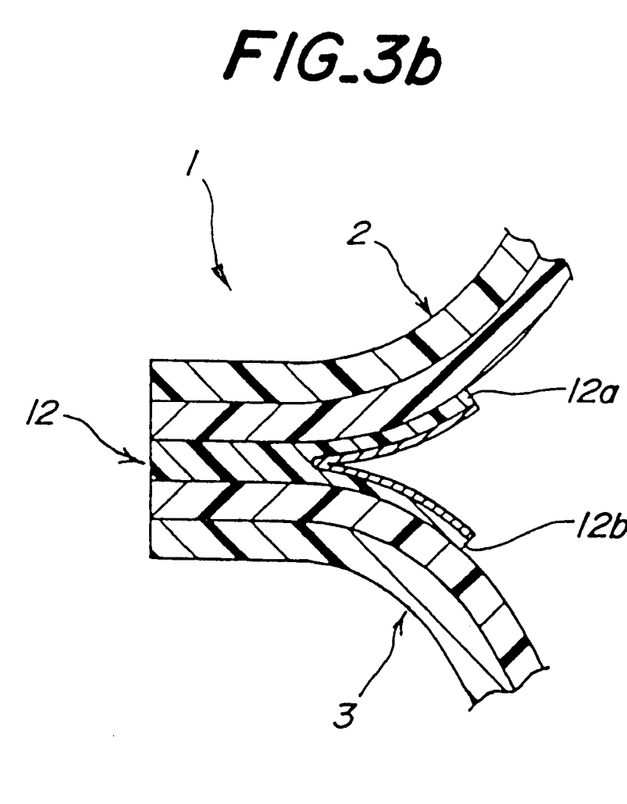

FIG. 3b is a sectional view illustrating a state of applying an internal pressure to the air bag 1 formed by welding the single weld layer 12 to the laminated films 2, 3 under the actuation of the electrodes 10a, 10b. In this case, since the weld layer 12 is unitary one and the joint portion is not existent in the weld layer, a larger force in the peeling direction can be supported by the weld layer 12. Further, separate portions 12a, 12b of the weld layer 12 adhered to the laminated films 2, 3 through the peeling member 11a can effectively contribute to support the force in the peeling direction. As a result, a large peel strength can be produced as compared with the joint structure shown in FIG. 2.

Figure 4:
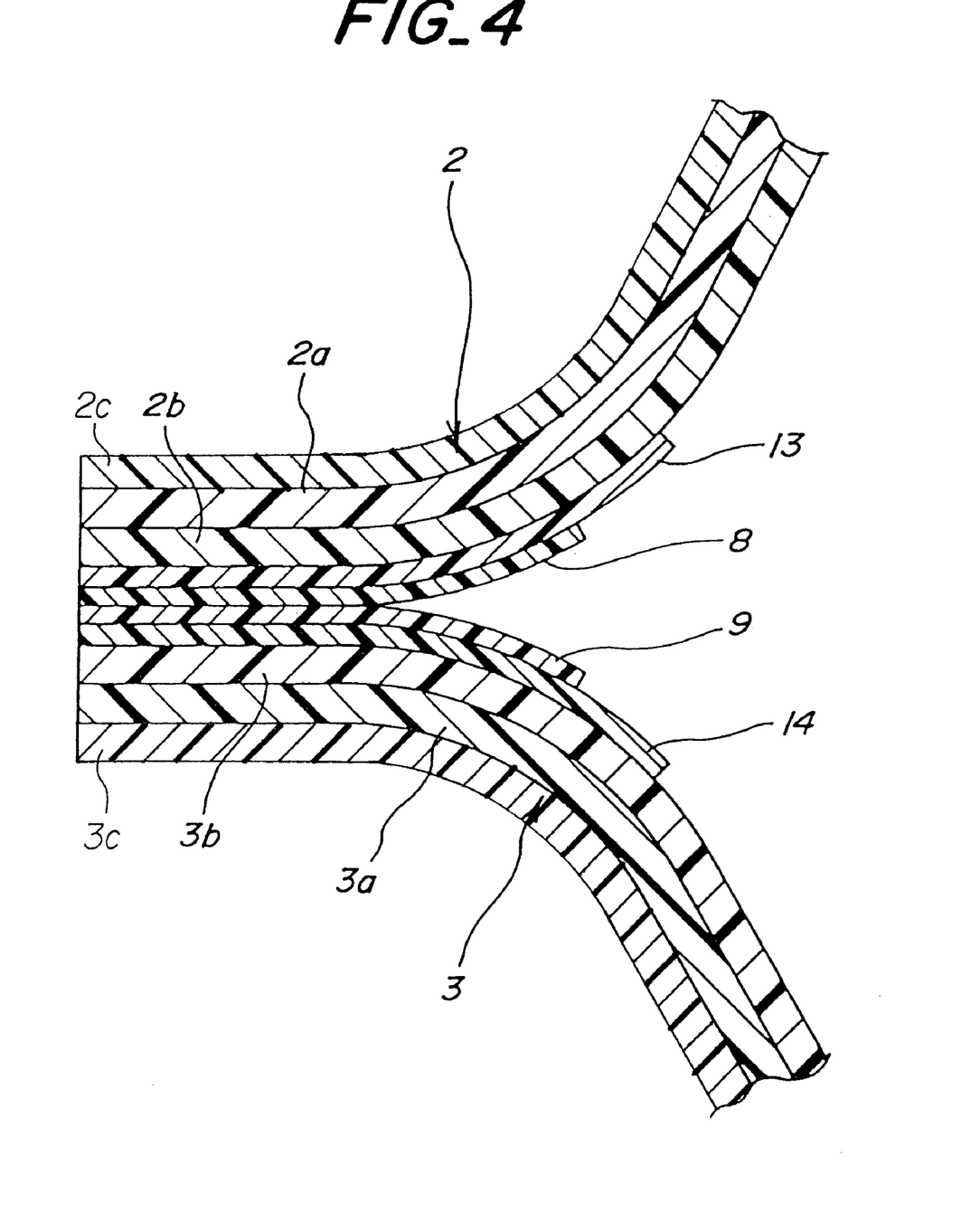
FIG. 4 is a partly enlarged section view illustrating a third embodiment of joining laminated films at their peripheral edge portions.

The peel strength can be more effectively improved by arranging two or more weld layers 8, 13 or 9, 14 having stepwise varied lengths viewed in section onto the laminated film 2 or 3 as shown in FIG. 4. FIG. 4 also schematically shows laminated films having 3 layers, 2a, 2b, 2c and 3a, 3b, and 3c for purposes of illustration.

Figure 5A:
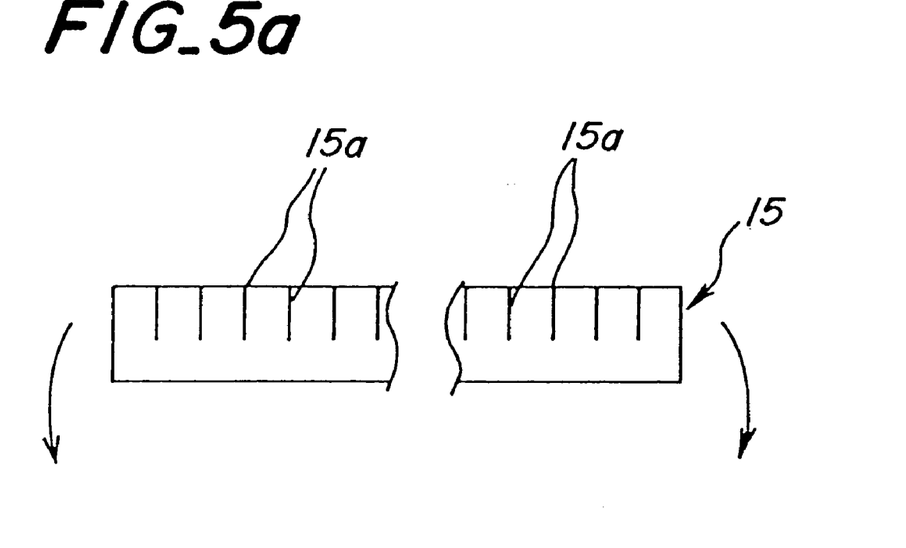
FIGS. 5a and 5b are a diagrammatic views illustrating a state of forming a weld layer.
Figure 5B:
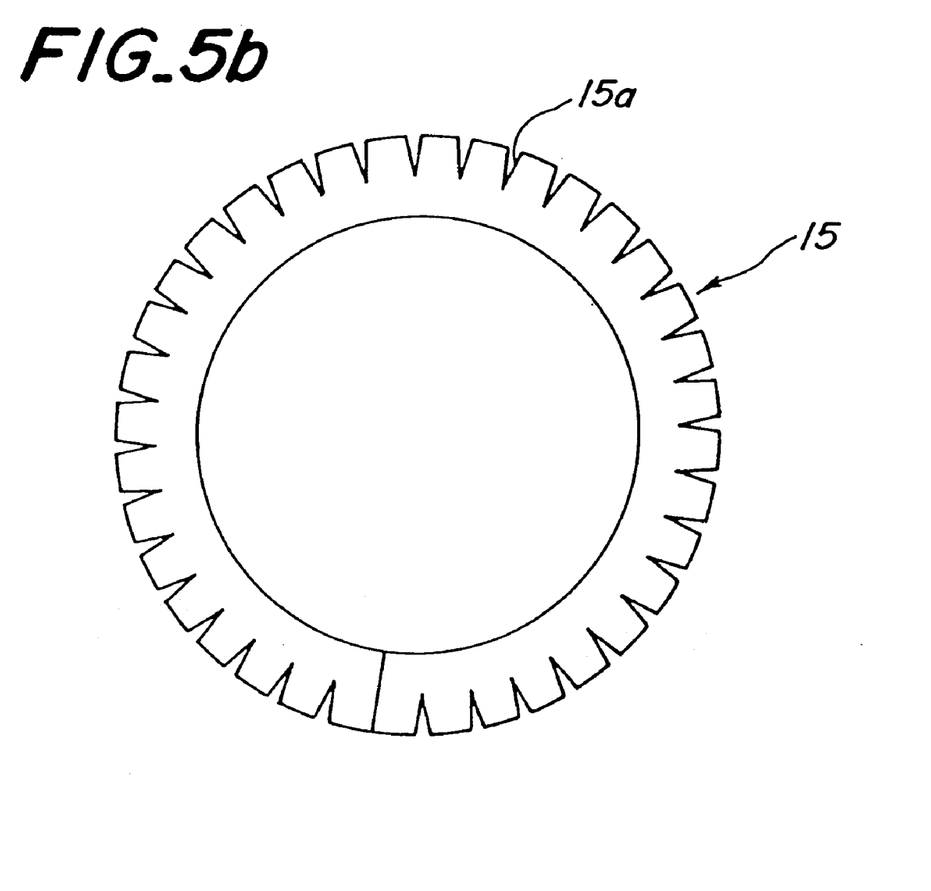

Each of the above weld layers, for example, weld layers 8, 9 may be formed as illustrated in FIG. 5a by forming a plurality of slits 15a in a tape-shaped body 15 having a constant width at given intervals. Then, the tape-shaped body 15 is converted into an annular ring as shown in FIG. 5b through the slits 15a to make its outer diameter substantially equal to an outer diameter of a joint portion between the laminated films 2 and 3, whereby the material treatment can be facilitated and the material yield can be significantly improved.

Figure 6:
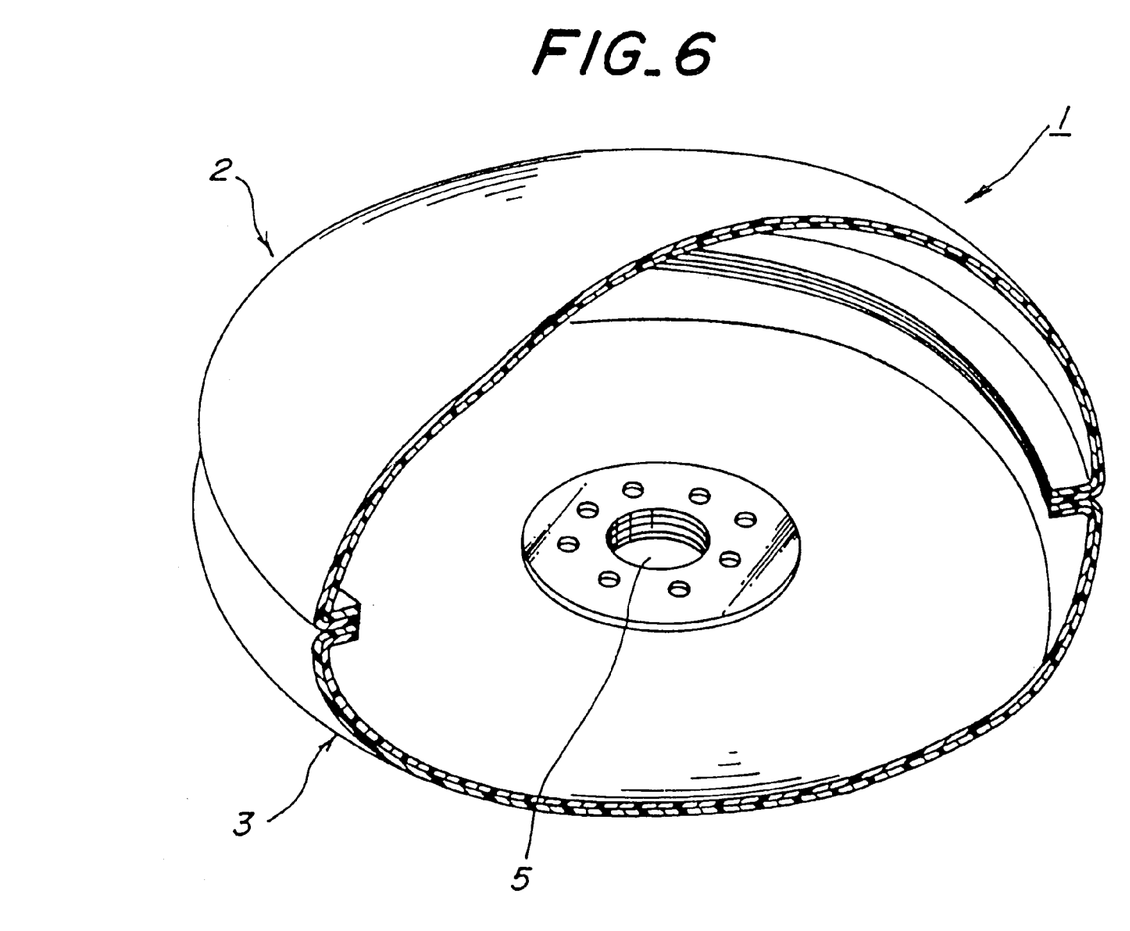
FIG. 6 is a perspective view partly shown in section of another embodiment of the air bag according to the invention.

Although various joint forms on the peripheral edge portions of the front-side and rear-side laminated films 2, 3 are described above, when the air bag 1 is turned over by utilizing a relatively large opening 5 for the insertion of an inflator formed in the rear-side laminated film 3, as shown in FIG. 6, the joint portion between the laminated films 2 and 3 is concealed at the inside of the air bag 1. The occupant of the vehicle can be effectively protected from the joint portion having a relatively high rigidity in the action of the air bag 1.

Figure 7:
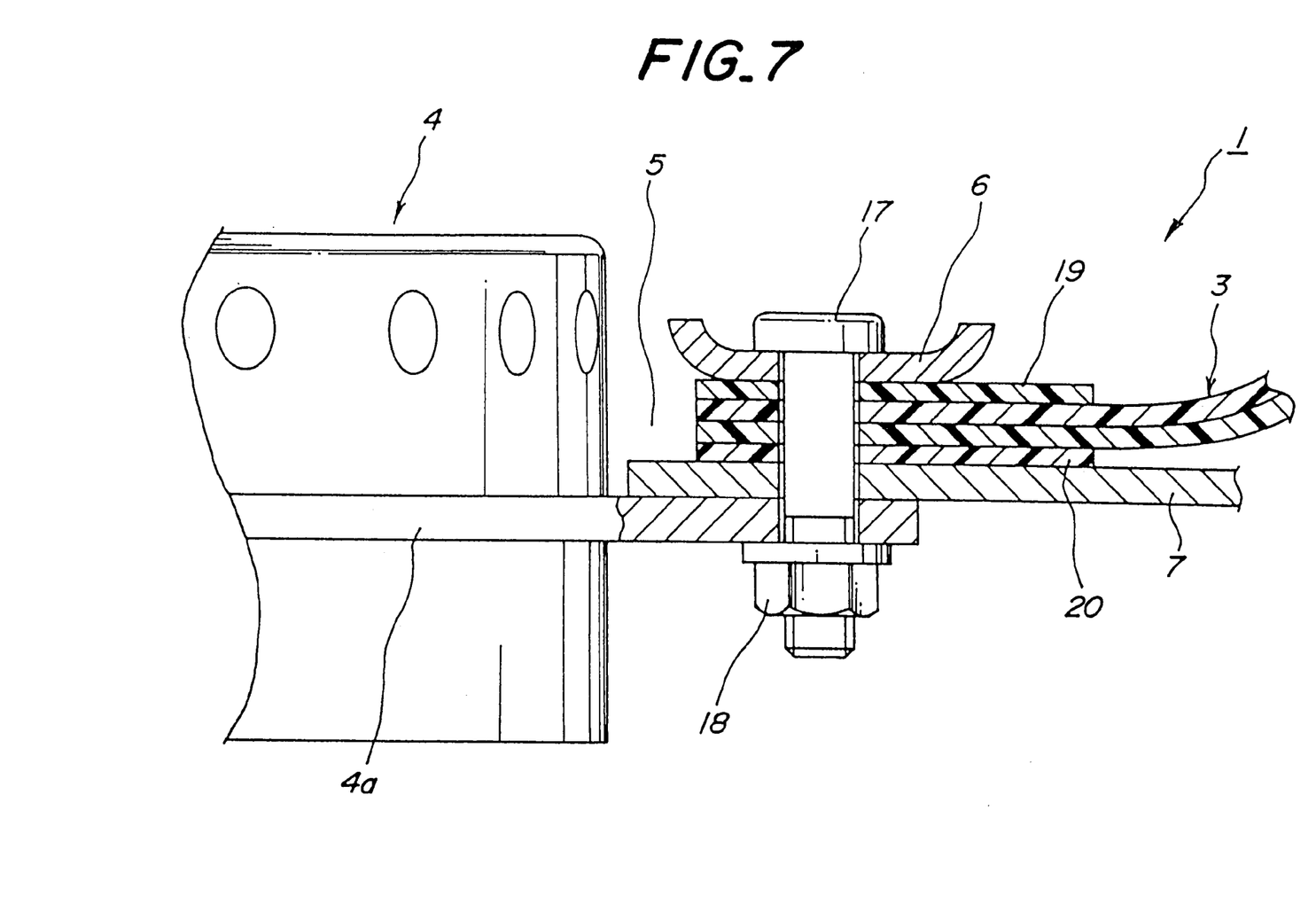
FIG. 7 is a partly enlarged section view illustrating a state of assembling an inflator into the air bag.

As shown by an enlarged section in FIG. 7, the assembling of the inflator 4 onto the air bag 1 is usually carried out by successively passing a plurality of bolts 17 through a retainer ring 6, a rear-side laminated film 3, a base plate 7 and a flange portion 4a of the inflator and then fastening them with reactive nuts 18. As a result, it is impossible to avoid the concentration of stress in a portion of the laminated film 3 passing the bolt 17 during the expansion of the air bag 1 or the like.

If the strength obtained by using only the laminated film 3 is not satisfactory, it is favorable that one or more reinforcing layers are arranged in at least a portion causing the stress concentration at either inner side or outer side or both sides of the laminated film 3.

FIG. 7 illustrates reinforcing layers 19, 20 adhered or welded to the inner side or outer side of the laminated film 3. In this case, each of the reinforcing layers 19, 20 may be made of an elastomer film, a single layer or multilayer laminated film, woven fabric, a single layer or multilayer laminated film adhered to woven fabric, a resin coating of woven fabric and the like.

When the reinforcing layer 19, 20 is made from the elastomer film having a relatively high flexibility, the sealing property in the assembled portion can be improved in addition to providing reinforcement. On the other hand, when the reinforcing layer 19, 20 is made from the single layer or multilayer laminated film, the reinforcing effect can be increased. When the reinforcing layer is made from the woven fabric base material, the reinforcing effect can further be improved.

When a plurality of reinforcing layers are arranged on at least one side of the laminated film 3, the material of the reinforcing layer to be used may be same or different.

According to the invention, the laminated film constituting the air bag is comprised of at least one elastomer layer and at least one shape holding layer, whereby the large energy absorption performance can be produced and the impact shock against the occupant of a vehicle can be effectively mitigated under high flexibility and elongation of the elastomer layer. When the laminated films are joined to locate the elastomer layers as an inner layer, the joint strength can be effectively increased.

Further, the shape holding layer laminated over the entire area of the elastomer layer sufficiently prevents excessively stretching deformation of the air bag to remove the problem of stress concentration in the elastomer layer due to the local stretching of the elastomer layer and breaking the air bag due to the excessive stretching of the elastomer layer and the like. Moreover, the shape holding layer can effectively compensate the lack of shock receiving ability when the elastomer layer is freely stretched without restraint. Additionally, the shape holding member can prevent the excessively free stretching of the elastomer layer and hence the breakage of the air bag due to the excessive stretching.

When using plural elastomer layers, the joint strength between the laminated films is improved to provide protection to the occupants of the vehicle. Also, the strength and sealing property in the portion surrounding the opening for the inflator can be enhanced and the fold strength of the air bag can be increased.

On the other hand, when using plural shape holding layers, a high shape-holding function against a large impact force can be developed while maintaining excellent energy absorption performance based on the action of the elastomer layer to sufficiently protect the elastomer layer from the excessive stretching and the like. Also, the strength in the portion surrounding the opening for the inflator can be further increased.

When the elastomer layer is made from the thermoplastic elastomer such as urethane, ester of amide, the joint strength between the laminated films is further increased and also the resistance to penetration of sharpened object can be enhanced.

When the shape holding layer is made from polycarbonate, polyamide, polyester, polyimide or thermoplastic elastomer having a JIS-A hardness of not less than 95°, the strength of the laminated film itself can largely be increased.

What is claimed is:

1. An air bag comprising; a pair of laminated films and an opening for the insertion of an inflator, in which each of the laminated films comprise at least one elastomer layer, at least one shape holding layer laminated together thereon over an entire confronting surface of said at least one elastomer layer of each of said pair of laminated films, and a weld layer affixed to said shape holding layer.

2. An air bag according to claim 1, wherein the elastomer layer is made from a thermoplastic elastomer selected from urethane, ester and amide.

3. An air bag according to claim 1, wherein the shape holding layer is made from a polycarbonate, a polyamide, a polyester, a polyimide or a thermoplastic elastomer having a JIS-A hardness of not less than 95°.

4. An air bag according to claim 1, wherein said weld layer is a thermoplastic material.

5. An air bag according to claim 1, further comprising a reinforcing layer affixed to a laminated film at an end portion of said film.

6. An air bag according to claim 5, wherein said reinforcing layer comprises an elastomer film.

7. An air bag comprising; a pair of laminated films and an opening for the insertion of an inflator, in which each of the laminated films comprises two elastomer layers and at least one shape holding layer, and wherein each laminated film comprises three layers composed of said two elastomer layers and said at least one shape holding layer interposed therebetween, with each of said elastomer layers laminated over an entire confronting surface of said at least one shape holding layer.

8. An air bag comprising; a pair of laminated films and an opening for the insertion of inflator, in which each of the laminated films comprises at least one elastomer layer and two shape holding layers and wherein the laminated film comprises three layers composed of said two shape holding layers and said at least one elastomer layer interposed therebetween, with each of said shape holding layer laminated over an entire confronting surface of said at least one elastomer layer.

* * * * *